2,980,697
BENZOTHIOPHENE COMPOUNDS

Otto Dann, Meilwaldstr. 11, Rudelsweiher, Erlangen, Germany

No Drawing. Filed Sept. 17, 1957, Ser. No. 684,404

Claims priority, application Germany Sept. 17, 1956

4 Claims. (Cl. 260—330.5)

The present invention relates to benzothiophene compounds; more particularly it concerns fluoroescent 2-aryl-benzothiophene-1,1-dioxides of the general formula

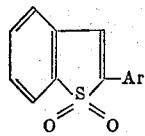

wherein Ar indicates an aromatic radical, such as, for instance, phenyl or naphthyl. The present invention concerns also the fluorescent substitution products of the said 2-aryl-benzothiophene-1,1-dioxides which contain, for instance, halogen, alkyl groups, hydroxy groups, alkoxy groups, free amino groups, substituted amino groups, sulfonic acid groups or carboxylic acid groups, and it concerns the functional derivatives of the substitution products, for instance the salts or esters of acid groups containing substitution products.

Furthermore the present invention concerns a process for the production of the aforesaid fluorescent 2-aryl-benzothiophene-1,1-dioxides and their substitution products. The process consists in that 2-aryl-benzothiophenes or their substitution products are oxidized, for instance, with a 30% hydrogen peroxide in glacial acetic acid or with peracids, such as perbenzoic acid in chloroform, chlorobenzene or other inert solvents.

The 2-aryl-benzothiophenes which serve as starting materials in the process of the invention may have been produced by any suitable method, for instance according to the German patent specification Nos. 864,559 and 871,452 by condensing aryl mercaptanes with halogen-methylaryl ketones and by splitting off water from the thioether ketones formed and rearrangement.

The 2-aryl-benzothiophene-1,1-dioxides of the present invention have valuable properties. On account of their strong fluorescence they can impart particular effects to materials such as textile materials, for instance to shaped articles of wool, cotton, linen, rayon, cellulose acetate, polyesters, polyamides or polyacrylonitriles as well as to the unshaped masses serving for their production; other materials which can be treated with the fluorescent 2-aryl-benzothiophene-1,1-dioxides are plastics, resins, lacquers, soaps, leather and paper. Fluorescent 2-aryl-benzothiophene-1,1-dioxides which have dyeing properties can impart to the materials treated a particular colored appearance by the combined effects of remission and fluorescence, and 2-aryl-benzothiophene-1,1-dioxides which absorb visible light only to a slight degree and which transform the ultraviolet light, however, to a high degree into visible light, give other special effects. Of particular interest are those fluorescent 2-aryl-benzothiophene-1,1-dioxides which are capable of transforming the ultraviolet portion of the daylight into blue or green light; they can in many cases be used for improving the whiteness of materials having a yellowish tint or for rendering dyed materials more brilliant. As the substituents often influence the absorption capacity and the fluorescence of the 2-aryl-benzothiophene-1,1-dioxides or their solubility and their behaviour against acids and dyes, it is possible to select by preliminary tests the compounds which are best suited for the purpose aimed at.

The application of the fluorescent 2-aryl-benzothiophene-1,1-dioxides for the various purposes can be performed in the usual manner. When the fluorescent compounds are to be used for whitening textile materials, it is in general expedient to apply the compounds in the from of aqueous solutions or dispersions or to apply them together with washing agents.

The following examples serve to illustrate the present invention without, however, limiting the scope thereof.

Example 1

1 part by weight of 2-phenyl-benzothiophene (M.P. 174–175° C.) is dissolved in about 50 parts by weight of glacial acetic acid. Thereafter there are added 5 parts by weight of a 30% hydrogen peroxide solution and this mixture is heated for about 45 minutes on the water bath. Into this hot reaction mixture thereafter cold water is dropped. The precipitated 2-phenyl-benzothiophene-1,1-dioxide is filtered off, washed with water and recrystallized from glacial acetic acid; melting point: 175–177° C.

If instead of the 2-phenyl-benzothiophene other benzothiophenes are used the following benzothiophene-dioxides are obtained:

5-methyl-2-phenyl-benzothiophene (M.P. 158–159° C.)→ 5-methyl-2-phenyl-benzothiophene-1,1-dioxide (M.P. 182–184° C.)

3-bromo-2-phenyl-benzothiophene (M.P. 63–64° C.)→3-bromo-2-phenyl-benzothiophene-1,1-dioxide (M.P. 151–152° C.)

2-(4'-chloro-phenyl)-benzothiophene (M.P. 197–198° C.)→2 - (4' - chloro - phenyl) - benzothiophene - 1,1-dioxide (M.P. 167–169° C.)

3-acetoxy-2-phenyl-benzothiophene (M.P. 75–77° C.)→ 3-acetoxy-2-phenyl-benzothiophene-1,1-dioxide (M.P. 164–166° C.)

5-chloro-2-phenyl-benzothiophene (M.P. 183–184° C.)→ 5-chloro-2-phenyl-benzothiophene-1,1-dioxide (M.P. 217–219° C.)

6-methoxy-2-phenyl-benzothiophene (M.P. 152–154° C.)→6 - methoxy - 2 - phenyl - benzothiophene - 1,1-dioxide (M.P. 162–164° C.)

6-ethoxy-5-methyl-2-phenyl-benzothiophene (M.P. 142–144° C.)→6-ethoxy-5-methyl-2-phenyl-benzothiophene-1,1-dioxide (M.P. 222–224° C.)

4,7-dimethyl-5-chloro-2-phenyl-benzothiophene (M.P. 86–88° C.)→4,7-dimethyl-5-chloro-2-phenyl-benzothiophene-1,1-dioxide (M.P. 232–234° C.)

4,7 - dimethyl - 5 - chloro - 2 - (4' - chloro - phenyl)-benzothiophene (M.P. 157–158° C.)→4,7-dimethyl-5-chloro-2-(4'-chloro-phenyl)-benzothiophene-1,1-dioxide (M.P. 279–281° C.)

2 - naphthyl - benzothiophene→2 - napthyl - benzothiophene-1,1-dioxide

2 - phenyl - naphthothiophene→2 - phenyl - naphthothiophene-1,1-dioxide

By hydrolyzing the 3-acetoxy-2-phenyl-benzothiophene-1,1-dioxide the 3-hydroxy-2-phenyl-benzothiophene-1,1-dioxide is obtained (M.P. 177–178° C.).

The benzothiophene-dioxides can be obtained as well from the benzothiophenes by the following method:

1 mole of 2-phenyl-benzothiophene is dissolved in chloroform. Thereto a perbenzoic acid solution containing 2 to 2.5 moles of perbenzoic acid is added. This reaction mixture is kept at room temperature or at 0° C. until 2 moles of the perbenzoic acid are used up (in about 8–24 hours). Then the reaction mixture is washed with diluted sodium carbonate solution and the solvent is evaporated. Thus, the 2-phenyl-benzothiophene-1,1-dioxide remains.

Example 2

10 parts of a 0.1% solution of 2-phenyl-benzothiophene-1,1-dioxide are stirred into 400 parts of water containing 1 part of a dispersing agent whereupon the suspension formed is mixed with 3 parts of a 10% formic acid. In the mixture 10 parts of a yarn made from polyethylene-terephthalate fibers are heated to the boil for 1 hour. Then the yarn is rinsed and dried. A high whitening effect is obtained which is very stable against light.

Instead of the 2-phenyl-benzothiophene-1,1-dioxide there can be used as well one of the other benzothiophene-1,1-dioxides mentioned in Example 1. Furthermore there can be used the diamino substitution product of the 2-phenyl-benzothiophene-1,1-dioxide which can be obtained as follows:

1 mole of 2-phenyl-benzothiophene-1,1-dioxide is dissolved in concentrated sulfuric acid. Thereto 2 moles of pulverized potassium nitrate are added and the solution is kept for about 12 hours at room temperature. Thereafter the reaction mixture is poured onto ice-water and the precipitated dinitro compound of the 2-phenyl-benzothiophene-1,1-dioxide is filtered off (M.P. 315–317° C.). This dinitro compound dissolved in glacial acetic acid is reduced with stannic chloride and hydrochloric acid. The bright orange colored fluorescent diamino compound has a melting point of 258–260° C. By acetylation the bright yellow diacetyl amino compound is obtained (M.P. 349–350° C.).

Example 3

5 parts of a 0.1% solution of 2-phenyl-benzothiophene-1,1-dioxide in dioxane are poured into 400 parts of water, wherein 1 part of a dispersing agent is dissolved. 10 parts of a cloth made from cellulose acetate fibers is immersed in this dispersion, the bath is heated to 60° C. and the cloth is moved therein at this temperature for half an hour. After rinsing and drying the cloth shows a strong whitening effect of a remarkable stability against light.

Example 4

0.5 part of 2-(p-chlorophenyl)-benzothiophene-1,1-dioxide are dissolved in a solution of 100 parts of polyacrylonitrile in such an amount of formamide as is necessary for the spinning process. The solution is then spun in the usual manner. The fibers show a considerable higher degree of whiteness than fibers obtained without the addition of the benzothiophene compound. The stability of the whitening effect against light is very good.

Example 5

0.5 part of the sodium salt of sulfonated 2-phenyl-benzothiophene-1,1-dioxide are mixed in suitable apparatus with 100 parts of a soap stock serving for the production of toilet soap and containing the usual ingredients such as parfums, antioxidants, white pigments or other coloring matter. The soap produced is brightened to an excellent degree.

The sulfonated 2-phenyl-benzothiophene-1,1-dioxide was obtained by the action of oleum on 2-phenyl-benzothiophene-1,1-dioxide at room temperature.

I claim:

1. A novel 2-aryl-benzothiophene-1,1-dioxide of the formula

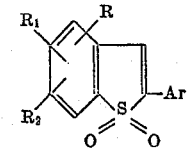

wherein Ar is selected from the group consisting of phenyl, p-chlor-phenyl, and naphthyl, and R, $R_1$, and $R_2$ are each selected from the group consisting of H, halogen, lower alkyl, —OH, lower alkoxy, nitro, amino, diacetylamino, sulfonic acid, and —COOH, and $R_1$ and $R_2$ taken together may form the phenyl ring which is fused to the benzene ring.

2. 2-phenyl-benzothiophene-1,-dioxide.

3. 2-(p-chlorophenyl)-benzothiophene-1,1-dioxide.

4. The sodium salt of sulphonated 2-phenyl-benzothiophene-1,1-dioxide, said salt being prepared by the sulfonation of 2-phenyl-benzothiophene-1,1-dioxide by the action of oleum at room temperature.

References Cited in the file of this patent

UNITED STATES PATENTS

| | | |
|---|---|---|
| 2,600,004 | Stanley | June 10, 1952 |
| 2,702,759 | Scalera et al. | Feb. 22, 1955 |
| 2,786,851 | Mahan | Mar. 26, 1957 |

FOREIGN PATENTS

| | | |
|---|---|---|
| 864,559 | Germany | Jan. 26, 1953 |

OTHER REFERENCES

H. D. Hartough and S. L. Meisel: Compounds With Condensed Thiophene Rings, Interscience, New York, 1954, p. 24, p. 32, p. 163, p. 164, W. B. Price and S. Smiles, J. Chem. Soc. (London), 1928, pp. 2858–63.

Aaron Cohen and Samuel Smiles: J. Chem. Soc. (London), 1930, pp. 406–414.